May 9, 1933.  G. W. DEWEES  1,908,474
CONNECTED BEARING
Filed June 12, 1930
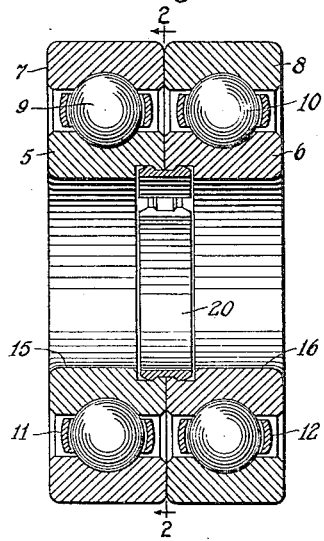
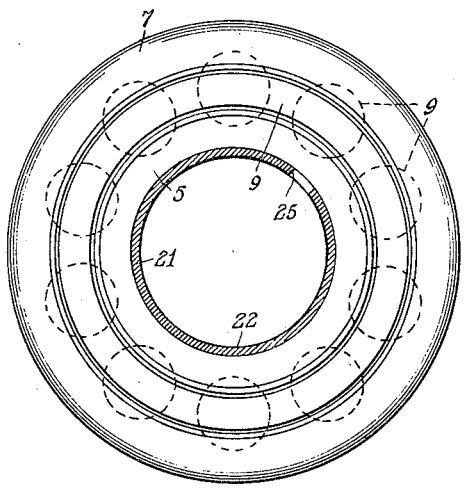
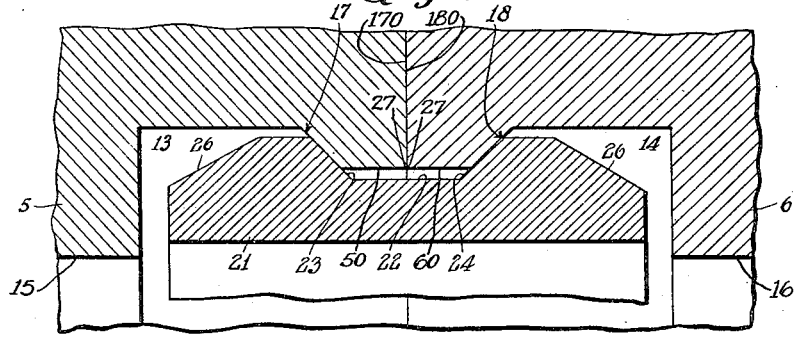
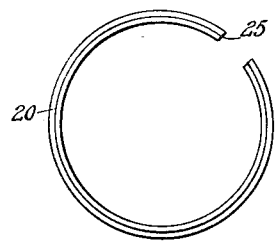
INVENTOR
GEORGE W. DEWEES
BY
his ATTORNEY Patented May 9, 1933

1,908,474

UNITED STATES PATENT OFFICE

GEORGE W. DEWEES, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF PENNSYLVANIA

CONNECTED BEARING

Application filed June 12, 1930. Serial No. 460,570.

This invention relates to connected machine parts and to means for connecting such parts and is primarily adapted for uniting with a fair degree of permanency, yet not rigidly, a pair of machine parts which are designed to be mounted upon a shaft so that they will be held together in handling and transportation and during the time of mounting, demounting and remounting.

The invention in its more specific application can, according to the design shown in the illustration which is the preferred form of my invention, hold together a pair of similar ball bearings so that for all practical purposes they are permanently united in their proper relationship; that is assuming that the bearings are of the angular contact unit handling type and one side of each bearing is designed as the side which shall be toward the other. It is desirable to have these bearings placed in their correct position by the manufacturer, and delivered in such position and relation to the ultimate user that he cannot, even though he separate the pair of bearings, put them together and mount them in the machine in any other relation than their predetermined correct relationship.

My improved manner of connecting the bearings permits them to be quickly united in their correct relationship and also permits them to be taken apart and reunited. This connecting device also is so formed and related to the other parts to be held, that they are held in certain, definite relationship as regards concentricity, but so that one bearing may yield in a radial direction in relation to the other bearing for accommodating certain inaccuracies of manufacture of the bearings themselves or of the part upon which or in which they are mounted.

The bearings with which I have particularly employed my invention are so formed that the proper angular contact of the balls in the race rings is brought about by applying a predetermined amount of pressure against two of the rings, preferably the inner rings, the meeting sides of such inner rings having been ground under conditions which require predetermined pressure to bring the narrow side of each into the meeting plane of the wider rings. The purpose of assuring that these bearings shall be so mounted that the two narrow sides are opposed to each other, led to the invention of this design. The bearings are delivered from the factory and to the ultimate consumer, properly united, and no matter how much they are handled or how many times they are placed on or removed from the shaft or the housing they will always occupy their predetermined correct relationship.

This assurance of correct assembly prevails whether an individual pair of bearings is formed according to the method of obtaining angular contact and predetermined, internal preloading, or whether a plurality of such bearings or a pair selected at random for assembly, or whether the bearings are manufactured for stock from time to time according to a predetermined formula.

When the bearings are manufactured by a predetermined formula, whether individually or by mass production, replacements may be made to a pair of bearings made in accordance with the system above outlined and embodying my invention.

In the accompanying drawing one practicable embodiment of the invention is illustrated, in which drawing:

Figure 1 is a central, longitudinal section of a pair of bearings connected according to the present invention.

Fig. 2 is a cross section taken at about the plane of the line 2—2 in Fig. 1.

Fig. 3 is an enlarged detail taken at about the plane of the section of Fig. 1, and Fig. 4 is an end view of the connecting ring.

In the drawing a pair of unit handling similar, and for all practical purposes identical ball bearings, is illustrated. The bearings of this pair comprise inner race rings 5 and 6, outer race rings 7 and 8, such rings being of the deep groove Conrad type and held together respectively by ball sets 9 and 10, the ball sets being shown as furnished with cages 11 and 12.

For the purpose of this description it will be assumed that it is desired to hold the two bearings together in a more or less flexible relationship and that it is also desired to hold the inner sides or abutting sides of their rings 5 and 6 in that relationship.

To accomplish my purpose recesses 13 and 14 are formed in the inner perimeters of the inner rings 5 and 6, such perimeters constituting what is generally known as the bores 15 and 16 of the rings. The recesses 13 and 14 are formed of some convenient shape and deep enough to accommodate a connecting ring 20, presently to be described, and to hold its bore 21 in a position where it clears or is located radially beyond the bores 15 and 16. The walls of the recesses 13 and 14 toward the abutting faces of the rings 5 and 6 are preferably formed as wedge shaped cams 17 and 18. The lands 170 and 180 between the cam faces 17 and 18 and the abutting faces 50 and 60 of the rings are disposed well beyond the surfaces of the bores 15 and 16.

In the illustration each of the recesses 13 and 14 is shown considerably nearer one side of the bearing race ring, the inner or abutting side. Also due to the location of each of the respective cam faces 17 and 18, the two sides of each recess differ one from the other. The purpose of this formation will be alluded to when the connecting ring 20 is being described.

The ring 20 is formed with a depression 22 in its outer side and two wedge shaped cam faces 23 and 24 adapted to respectively engage cam faces 17 and 18.

The ring 20 is preferably elastically yieldable and may to advantage be formed of steel and hardened and tempered. When this heat treatment is employed I have found it preferable to cut the gap 25 in the ring after tempering it.

The ring 20 is of sufficient expansibility that when it is in position its cam faces 23 and 24 engage the faces 17 and 18, the expansion of the ring 20 then serving to cause its cam faces above mentioned 23 and 24 to engage the cam faces 17 and 18 on the rings and press these rings one toward the other. After the pair of connected bearings is in position and one of the rings, the ring 6, is against a shoulder and a nut is screwed up against the other ring 5 tightening and pressing the abutting faces of such rings together, the further expansion of the ring 20 will hold it securely in position so that it will not move while the bearing is in use. Such movement would of course tend to make an objectionable noise.

It will be apparent by reference to the drawing that the connecting ring 20 can be entered in the recesses 13 and 14 from one side only of each race ring, owing to the location of the side walls of such recesses in relation to the outer sides of the race rings.

The manner of assembling the two bearings and connecting them together according to this invention may be practiced in several ways. The preferred method of doing this is for the operator to first take one of the bearings, we will say the bearing at the left hand side in Figs. 1 and 3, and present one of the slanting faces 26 of the ring 20 against the corner 27 of the bearing and firmly press the ring so that the camming action of the face 26 causes the ring to compress and the gap 25 to practically close. Further pressure brings the cam face 23 back of the cam face 17, whereupon further expansion of the ring 20 is permitted. The operator then takes the bearing represented on the right hand side and presses its corner 27 against the exposed cam face 26 which again causes the ring 20 to be compressed, and when thus compressed, there is room enough for the inwardly extending portion carrying the cam faces 17 and 18 to engage the cam faces 23 and 24 and upon the connecting ring expanding to hold the two rings 5 and 6 in concentric relation.

The formation of the parts and their relationship is such that the bores 15 and 16 are held practically in concentric relationship, but the parts are also so formed that one bearing may yield radially in respect to the other without causing a separation or unfastening of the two bearings. This yieldability or flexibility is further advantageous in mounting the bearings either in their housing or upon the shaft.

The relative angles of the cam faces 17 and 18 and the cam faces 23 and 24 is such that the parts are held together with sufficient force to resist ordinary handling and assembling, but are also such that when it is desired to separate the bearings, this may be accomplished and one or both faces 17 and 18 will ride upon the faces 23 and 24, whereby compressing the ring 20 and permitting disassembly.

Although but one form of the invention is illustrated, which at present is the preferred form, it will be apparent that changes may be made within the scope of the claims without departing from the spirit of my invention.

Having described my invention, I claim and desire to secure by Letters Patent:

1. In combination a pair of similar unit handling angular contact ball bearings, one side of each bearing being designed as the meeting side which shall be toward the meeting side of the other bearing, the inner races being slightly spaced when the outer races are in contact, there being formed in the bore of the inner race of each bearing a recess, the side wall of such recess which is adjacent the meeting side of the bearing differing from the other side wall, and a split ring having a pair of cam faces for engaging the walls of the recesses adjacent the meeting sides of the inner races of the bearings and holding the pair of bearings united in their predetermined correct relationship, with the inner races in contact.

2. In combination a pair of similar unit handling angular contact ball bearings, the inner races being slightly spaced when the outer races are in contact, there being formed in the bore of each bearing a recess, the recess in each ring being nearer one side of the ring than it is to the other side, and one of the side walls of such recess differing from the other side wall, and a split ring having a pair of cams formed on its outer surfaces and being adapted to engage the sides of the bearings when they are in position for assembly, such ring also having cam faces for engaging the walls of the recesses adjacent the meeting sides of the inner races of the bearings and holding the pair of bearings united in their predetermined correct relationship, with the inner races in contact.

Signed at Philadelphia this tenth day of June, 1930.

GEO. W. DEWEES.